March 22, 1955 J. H. SMITHSON 2,704,765
FORMALDEHYDE POLYMERS
Filed Nov. 18, 1949
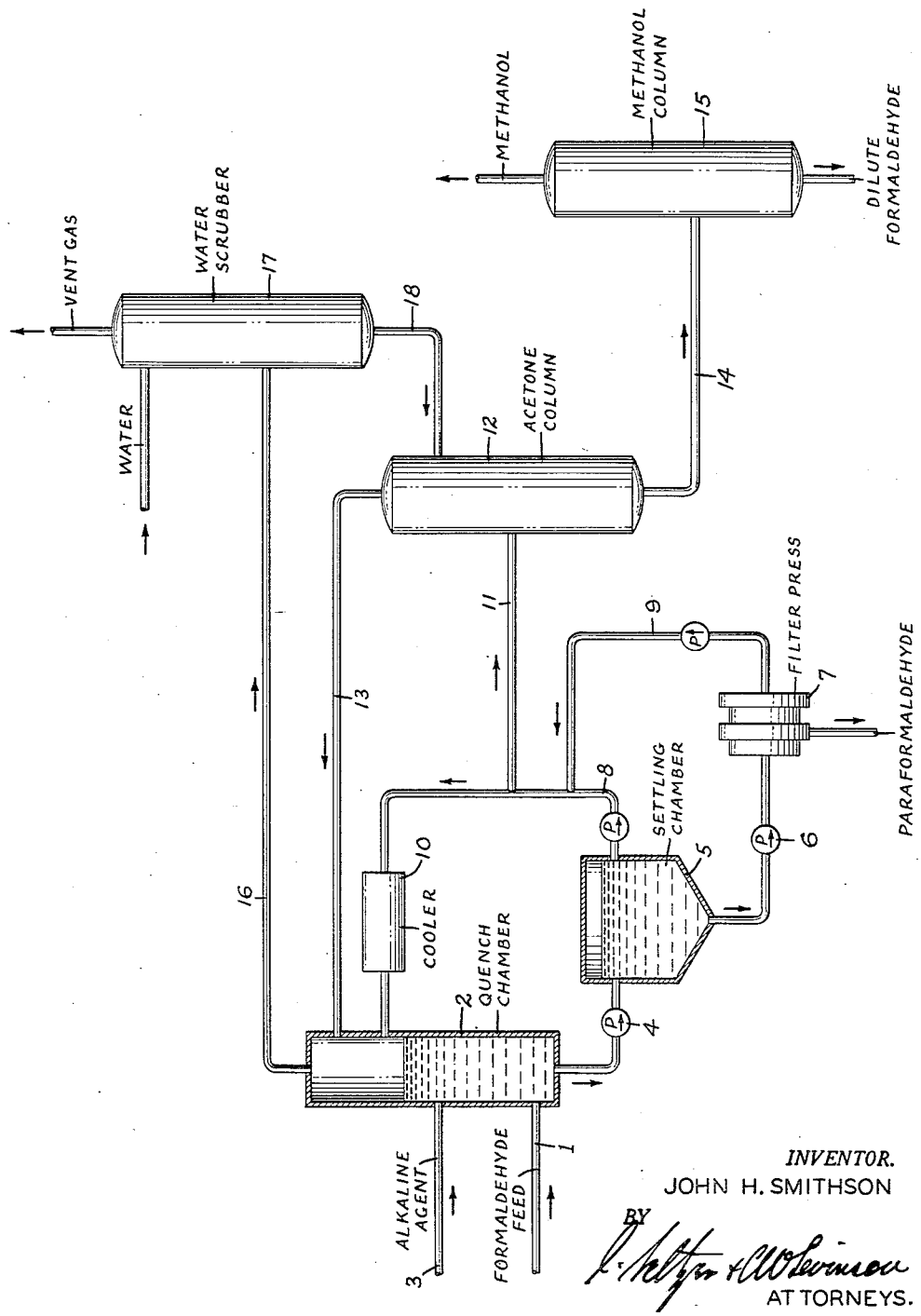
INVENTOR.
JOHN H. SMITHSON
BY
ATTORNEYS.

United States Patent Office 2,704,765
Patented Mar. 22, 1955

2,704,765

FORMALDEHYDE POLYMERS

John H. Smithson, Hicksville, N. Y., assignor to Celanese Corporation of America, New York, N. Y., a corporation of Delaware Application November 18, 1949, Serial No. 128,149

1 Claim. (Cl. 260—340)

This invention relates to the production of paraformaldehyde and relates more particularly to an improved process for the continuous production of paraformaldehyde from concentrated formaldehyde vapors whereby the paraformaldehyde may be obtained in high yield and of a high degree of purity. The term "paraformaldehyde," as employed in the art, includes solid compositions of water and formaldehyde containing 80% by weight or more of formaldehyde.

An object of this invention is the provision of an improved process for the production of paraformaldehyde from vapors of relatively high formaldehyde content wherein the concentrated formaldehyde vapors are quenched in a non-solvent liquid medium.

Another object of this invention is the provision of a process for the production of paraformaldehyde from formaldehyde vapors whereby paraformaldehyde of a high degree of purity and of ready solubility in water may be obtained in a continuous manner.

Other objects of this invention will appear from the following detailed description and the accompanying drawing.

The drawing is a diagrammatic showing of the manner in which the novel process of my invention may be carried out.

Paraformaldehyde comprises a mixture of formaldehyde polymers, solid or semi-solid in physical form, and associated with varying amounts of water. Since paraformaldehyde contains a small amount of water compared to the usual aqueous solution containing 37% formaldehyde by weight which is commonly employed commercially, it is convenient to handle and is highly economical to transport. When paraformaldehyde is dissolved in water a depolymerization takes place and aqueous solutions of any desired concentration may readily be formed. The average degree of polymerization of paraformaldehyde varies depending upon the conditions employed for the production of the polymer. The water content of the solid may also be varied and may be reduced substantially by subjecting the solid polymer to various drying procedures. The production of paraformaldehyde of an excessively high degree of polymerization by the concentration of formaldehyde yields a product which is commercially undesirable in that it is not easily and quickly redissolved in water. Paraformaldehyde of too low a degree of polymerization is also undesirable in that it is quite soft and difficult to handle and, furthermore, is of relatively low formaldehyde content. A commercially practical process wherein paraformaldehyde of high purity and controlled degree of polymerization may be obtained continuously and with a degree of polymerization enabling it to be employed satisfactorily for commercial operations has long been sought.

I have now found that paraformaldehyde of a degree of polymerization suitable for wide commercial use and of high purity may be readily obtained by a novel, continuous process. In accordance with the novel process of my invention, a vapor feed of relatively high formaldehyde content, e. g. containing from about 60 to 90% by weight of formaldehyde, and which may also contain one or more inert diluents such as water vapor, methanol, methane or carbon oxides is introduced into an organic liquid quenching medium which is a non-solvent for the formaldehyde and which also contains an added alkaline or acidic material which acts as a polymerization catalyst. Preferably, the quenching medium is maintained at a temperature of 10 to 40 C. The formaldehyde vapors are condensed as they pass into the non-solvent organic quenching medium and, under the action of the alkaline material present in the organic liquid quenching medium, a rapid polymerization of the formaldehyde condensate takes place. The quenching medium containing the formaldehyde polymer is then passed to a settling chamber wherein further polymerization takes place and the paraformaldehyde formed separates out at the base of the chamber. The paraformaldehyde is removed from the base of the settling chamber as a slurry in the organic quenching medium. The remaining supernatant liquid quench medium is continuously removed from the top of the settling chamber, is recycled through an intermediate cooler and is then returned to the quench chamber where the quench liquid is employed to effect further condensation and polymerization.

The polymerization catalyst present in the organic quench liquid is introduced by continuously adding an alkaline agent such as triethylamine, sodium carbonate or sodium hydroxide, or an acidic agent such as sulfuric acid to the liquid medium in the quench chamber. Preferably, the alkaline or acidic addition to the organic quench liquid is such that when the quench medium is diluted with water to form a 50% by weight aqueous solution, the pH of said aqueous solution will be from about 4 to about 8 when an alkaline addition is made, or less than 2 when an acid addition is made.

The paraformaldehyde slurry removed from the base of the settling chamber may be passed to a filter press or centrifugal separator where the organic liquid quenching medium is separated and then recycled to the quench chamber. The paraformaldehyde cake may then be air dried, pulverized, melted and fed to a drum flaker to convert it to flakes or the molten paraformaldehyde may be spray dried to yield spherical particles. An additional drying of the flakes or particles may also be employed if further reduction in the water content is desired. Paraformaldehyde which contains 88 to 95% formaldehyde and which is easily and completely soluble in water may thus be readily obtained.

As examples of organic liquids in which formaldehyde is not soluble and which may be employed as the quench medium in the novel process of my invention there may be mentioned acetone, methylal, diethyl ether and tetrahydrofuran.

Formaldehyde vapors from any convenient source may be condensed and polymerized to paraformaldehyde in accordance with my process. Thus, dilute formaldehyde solutions may be concentrated by evaporation or vacuum distillation and the concentrated formaldehyde solution then vaporized and subjected to a quenching and polymerization as described. The product of the vapor phase oxidation or dehydrogenation of methanol may also be employed directly in said process for the production of paraformaldehyde. Any unreacted methanol contained therein does not interfere with the quenching step and the subsequent polymerization reaction. The unreacted methanol may be recovered from the quenching medium and then recycled to the methanol oxidation or dehydrogenation unit where it may be converted to formaldehyde.

In order further to illustrate the novel process of my invention, reference may be had to the accompanying drawing wherein a preferred embodiment of my novel formaldehyde condensation and polymerization process is shown.

Referring now to the drawing, a mixture of formaldehyde and methanol vapors containing from 60 to 70% by weight of formaldehyde, and obtained as the product of the catalytic vapor phase oxidation of methanol or methylal is introduced through a feed line 1 into a quenching chamber 2 filled about two-thirds full of acetone at a temperature of about 10 to 40° C. The acetone quench medium contains sufficient sodium hydroxide so that, when the acetone solution is diluted with an equal amount by weight of water, the pH of the diluted solution obtained is about 7. The sodium hydroxide is introduced into the quenching chamber 2 through a feed line 3 in the form of a 10 to 40% by weight aqueous solution and in sufficient volume to neutralize any formic or other acid in the vapors and also to maintain a pH of 5 to 8 in the quenching medium, said pH being measured after diluting the quenching medium with an equal weight of water. The entering formaldehyde vapors are immediately condensed upon passing into the alkali-containing acetone solution and, due to the presence of the sodium hydroxide, polymerization is initiated. The reaction mixture formed is withdrawn from the base of the quenching chamber 2 by a centrifugal pump 4 and passed into a settling chamber 5 which is preferably provided with a conical base to enhance settling of the paraformaldehyde present. The polymerization of the formaldehyde which is initiated in quenching chamber 2 continues and is completed in settling chamber 5. The solidified, insoluble paraformaldehyde formed settles in the conical base of settling chamber 5. A slurry of paraformaldehyde and quenching medium is withdrawn from the base of settling chamber 5 and forced by means of a pump 6 through a filter press 7. The supernatant liquid in the settling chamber 5, comprising acetone, methanol and some water, is withdrawn from said settling chamber through the line 8, the liquid is combined with the filtrate from filter press 7 leaving the latter through a line 9 which joins line 8 as shown and the combined quench liquid is then passed through a cooler 10. The temperature of the quench liquid is brought down to about 10 to 30° C. in cooler 10 and the cooled liquid medium is then returned to quenching chamber 2.

In order to avoid an excessive build-up of either water or methanol in the quenching liquid, a side stream of the combined quench liquor from lines 8 and 9 is withdrawn and passed through a line 11 to an acetone distillation column 12. The overhead product of acetone distillation column 12 comprises an acetone-methanol azeotrope, which mixture is returned to quench chamber 2 through line 13. A dilute aqueous solution of formaldehyde and methanol is removed from the base of acetone column 12 and passed through line 14 to a methanol distillation column 15 where the methanol is separated and recycled to the oxidation unit employed. Dilute aqueous formaldehyde is obtained from the base of column 15. This dilute formaldehyde solution may be concentrated to 37% commercial aqueous formaldehyde or concentrated further and vapors of the concentrated solution obtained are gradually introduced with the formaldehyde feed entering quenching chamber 2 through line 1.

Some formaldehyde vapor is present above the quench liquor in the quenching chamber 2 due to the vapor pressure of the formaldehyde undergoing condensation and polymerization. This formaldehyde is recovered by passing the formaldehyde vapor through a line 16 into a water scrubber 17 which scrubs out the formaldehyde and other water-solubles such as acetone. The remaining non-condensables are vented to the atmosphere. The aqueous formaldehyde solution formed in the water absorber 17 is returned to the acetone column 12 through a line 18. The vented gases also include some carbon monoxide, carbon dioxide and some hydrogen which may be formed during the catalytic vapor phase oxidation of the methanol.

My novel process is highly advantageous in that impure formaldehyde vapors may be employed. The impurities which may be present therein are largely removed during the acetone quenching step allowing relatively pure paraformaldehyde to be obtained. In addition, the degree of polymerization of the paraformaldehyde formed can be regulated when carrying out my novel process by adjusting the alkaline content of the quenching medium. A higher alkaline content which gives a higher pH when the quenching medium is diluted with water causes paraformaldehyde of a higher degree of polymerization to be formed. Furthermore, the method of precipitation I employ causes the formation of a denser and more easily filtered and handled paraformaldehyde.

It is to be understood that the foregoing detailed description is given merely by way of illustration and that many variations may be made therein without departing from the spirit of my invention.

Having described my invention, what I desire to secure by Letters Patent is:

In a process for the production of paraformaldehyde, the steps which comprise passing vapors containing methanol and about 60 to 90% of formaldehyde into acetone containing sulfuric acid and maintained at a temperature of 10 to 40° C. in an absorption zone, condensing the formaldehyde vapors in said acetone and allowing the condensed formaldehyde to polymerize therein whereby solid paraformaldehyde is formed, passing the resulting mixture to a settling zone and effecting settling of the paraformaldehyde in the latter zone to produce a slurry of paraformaldehyde and acetone, and filtering all of the resulting slurry to separate the paraformaldehyde therefrom, the amount of sulfuric acid in said acetone being such that when the mixture containing acetone and sulfuric acid is diluted with water to form a 50% by weight aqueous solution the pH of said aqueous solution is less than 2.

References Cited in the file of this patent

UNITED STATES PATENTS

| | | |
|---|---|---|
| 2,153,526 | Walker | Apr. 4, 1939 |
| 2,257,780 | Bludworth | Oct. 7, 1941 |
| 2,318,341 | Thompson | May 4, 1943 |
| 2,369,504 | Walker | Feb. 13, 1945 |
| 2,373,777 | Peterson | Apr. 17, 1945 |
| 2,442,942 | Tuerck | June 8, 1948 |
| 2,593,862 | Eickmeyer | Apr. 22, 1952 |

FOREIGN PATENTS

| | | |
|---|---|---|
| 132,529 | Great Britain | Sept. 2, 1920 |